Aug. 28, 1951     G. F. OEST     2,565,619
TIRE CASING
Filed Aug. 23, 1949
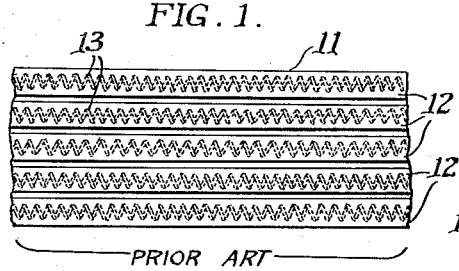
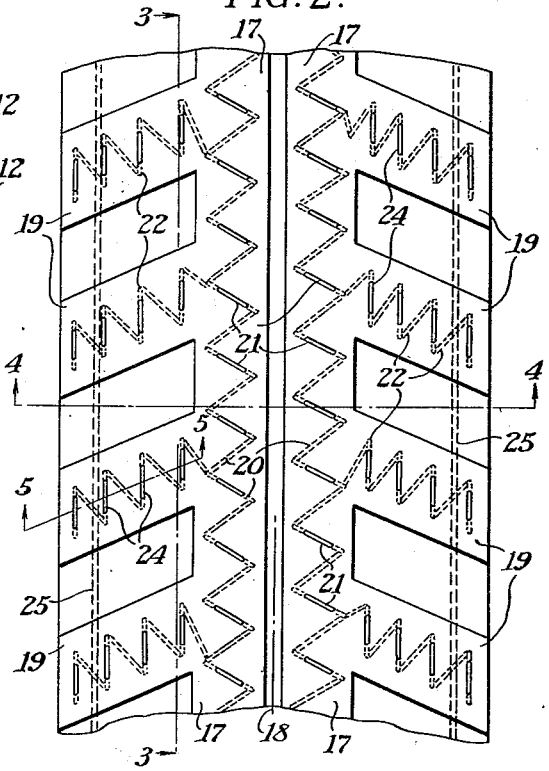
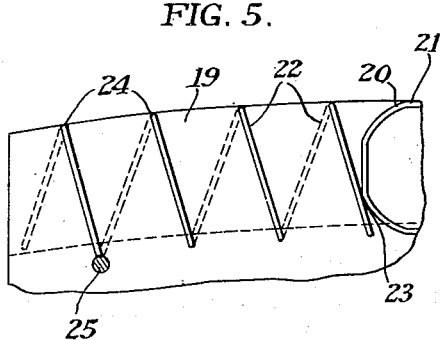
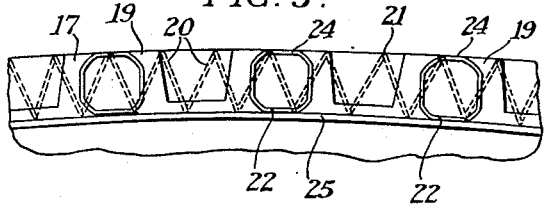
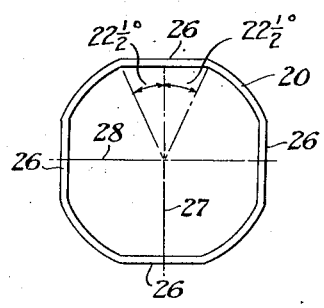
GEORGE F. OEST
INVENTOR
BY William E. Neely
ATTORNEY Patented Aug. 28, 1951

2,565,619

UNITED STATES PATENT OFFICE 2,565,619

TIRE CASING

George F. Oest, Rochester, N. Y., assignor of one-fifth to Walter Oest, Omaha, Nebr., and one-fifth to Irwin W. Oest, Minneapolis, Minn.

Application August 23, 1949, Serial No. 111,829

10 Claims. (Cl. 152—211)

1

The present invention relates to a pneumatic tire casing, primarily intended for automobiles, and more particularly to a casing provided with a non-skidding snow tread. The term "snow tread" refers to the usual well-known large, thick rubber treads or blocks applied to the outer surface of a pneumatic tire casing to afford the desired degree of traction.

Really effective winter tires should (1) prevent skidding on ice and (2) offer the necessary degree of traction in snow and/or slush. There is one type of tire that satisfies the first condition, and several types of tire which satisfy the second condition. However, as far as the applicant knows, there is no one tire construction that satisfies both conditions. The present invention, therefore, relates to an improvement on a tire that satisfies the first condition so as to make it satisfy the second as well.

The present invention has as its principal object the provision of a snow tread tire designed to prevent skidding on ice and also to afford the desired traction in snow and/or slush.

A further object of the invention is the provision of an arrangement in a tire of the class described for positioning and anchoring the non-skidding device or members in proper position in the tire treads.

To these and other ends, the invention resides in certain improvements and combinations of parts, all as will be hereinafter more fully described, the novel features being pointed out in the claims at the end of the specification.

In the drawings:

Fig. 1 is a plan view of a tire construction of the prior art, designed for preventing skidding on ice;

Fig. 2 is a plan view of a portion of a tire casing provided with a snow tread, showing the relation thereto of a non-skidding and traction-producing member constructed in accordance with the preferred embodiment of the present invention;

Fig. 3 is a partial radial sectional view of the tread arrangement illustrated in Fig. 2, showing the non-skidding and traction-producing coils, and the anchoring means therefor, taken substantially on line 3—3 of Fig. 2.

Fig. 4 is a transverse sectional view taken through the snow tread of the tire illustrated in Fig. 2 and taken substantially on line 4—4 of Fig. 2 thereof, showing the wire coil arrangements;

Fig. 5 is a transverse sectional view taken substantially on line 5—5 of Fig. 2, showing the relation of the peripheral and lateral coils and the anchoring means for the latter; and Fig. 6 is a transverse sectional view through one of the coils, showing the "squaring" of the coils so as to retain the latter in position in the tread of the tire casing.

Similar reference numerals throughout the various views indicate the same parts.

Fig. 1 of the drawings shows the prior "one" type of tire mentioned above. This tire has the outer surface of the casing 11 provided with a plurality of substantially parallel circumferential conventional treads 12. Each of these treads has embedded therein a separate annular wire coil 13 to afford abrasive action on ice. This tire is formed with a plurality of treads, each with its separate wire coil, and each coil is slightly greater in length than the circumference of the tread. In molding the tread of such a tire, these wire coils are placed individually in the mold. Such a tire or casing construction is adapted to prevent skidding on ice, but is not suitable for use in snow and/or slush.

The present invention provides a tire casing which embodies the non-skidding properties of the above-described tire, yet is equally well adapted to afford the desired traction in snow and/or slush, the advantages of which are deemed apparent. To secure this result, the present invention provides a tire casing which is provided with a "snow tread" which comprises, in the preferred form, a pair of central peripheral treads 17 which extend completely around the circumference of the tire and are positioned on opposite sides of the center line 18 of the tire, as shown in Fig. 2. Each of these peripheral treads is straight, and is arranged substantially in a single plane, as shown in the drawings. A plurality of other treads 19 project laterally from the peripheral tread 17 and are connected at one end to the latter. As is well-known, such "snow treads" 17 and 19 are heavier and deeper than the conventional treads so as to secure the desired traction.

Each tread 17 has positioned therein a continuous annular coil of wire 20 which preferably has a length which is slightly greater than the periphery of the tread 17 so that when the ends of the coil are arranged in an abutting relation, the coil will maintain its position, in annular form, in the mold. Furthermore, each coil 20 has the approximate width of the tread 17 and is arranged with the upper periphery substantially flush with the outer surface of the tread 17 so that small sections of the coil will be exposed, as indicated at 21, Fig. 2.

In addition to the two central peripheral coils 20, which are present in the preferred form, the present invention also provides other coils 22 which are positioned in the lateral treads 19. In the preferred form of the invention there is one of each such coil 22 in each lateral tread 19. However, more than one coil can be positioned in each or any of the lateral treads 19. Further, even though maximum benefits are obtained when each lateral tread 19 has one or more coils appropriately positioned therein, it is apparent that substantial benefits can be obtained even though all the lateral treads 19 do not have a coil positioned therein. Accordingly, my improved tire casing is not restricted to the preferred form.

In the preferred form of the invention the inner ends 23 of the coils 22 are welded, tied, or otherwise secured to the adjacent peripheral coil 20 better to anchor and position the inner end of each of the short lateral coils 22. Each coil 22 is positioned in its tread 19 so that its upper periphery is flush with the upper surface of the tread 19 so as to provide a small exposed portion, as shown at 24 in Fig. 2. Furthermore, each coil 22 has a diameter which is slightly greater than the depth of the tread 19 so as to extend slightly below the latter, for a purpose to be presently described.

In addition to anchoring the inner end of each lateral coil 22, it is desirable also to anchor or secure the outer end thereof. To secure this result, the present invention provides a pair of annular peripheral extending members 25 positioned on opposite sides of the central treads 17 and arranged substantially parallel thereto as illustrated in Figs. 2–5. These members 25 may be in a form of metal or plastic rods, and are arranged in the tire casing slightly below the treads 19 so as not to be exposed therebetween. The coils 22 extend slightly below the treads 19 and have their lower portions connected near or at their ends, to the rods 25, in any suitable manner, such, for example, as welding or tieing. As these rods 25 are positioned just below the coils 22 they are molded into the tire in the portion of the rubber just above the fabric of the casing.

As previously indicated, in the preferred form of the invention there are two central peripheral treads 17 from each of which there project a plurality of treads 19. Also in the preferred form there are rods 25 positioned on opposite sides of the central treads 17 and arranged parallel or substantially parallel thereto. Again in the preferred form there is a coil in each of the treads 17 and 19 and each of the coils 22 positioned in the treads 19 is connected at one end to the coil 20 and at or near the other end to the rod 25. It is not essential that the coils 22 be attached to either the coils 20 or the rods 25 as they will remain in position without being so attached. If it is not desired to attach the coils 22 to the rods 25, the rods 25 are unnecessary. In constructing a tire casing embodying the preferred form of the invention, the lateral or transverse coils 22 are attached to a coil 20 and a rod 25 and the unit thus formed is positioned in the mold. In such an arrangement all the members 20, 22 and 25 cooperate to maintain the entire system of coils and rods in position in the mold as well as in the finished tire casing. Additionally, construction of the tire casing is facilitated.

The peripheral coils 20 may have a diameter equal only to the depth of the treads 17, or, as shown, for example, in Fig. 3, they may be made slightly larger to have a diameter greater than the depth of the treads 17 and equal in diameter to the coils 22 so that all coils may be of the same diameter.

In order to retain the various coils in position in the treads and to keep the wires from working out of the tire once the top surface of the wires has been worn through, the various coils are "squared"; that is, each coil is provided with one or more "flat sections" positioned around its periphery. In the preferred construction, four such "squared" or "flat" sections are provided, and are spaced apart approximately 90°, as shown in Fig. 6. Each section may be of a suitable length but it is desirable that they extend for approximately 22½° on either side of the vertical and horizontal axis 27 and 28, respectively, as shown in Fig. 6. Instead of the squared sections, the periphery of each coil may be knurled or roughened so as to retain it in position in the particular tread. In addition, the wires forming the coils should be flexible instead of brittle so as to withstand the flexing of the tire. Also, it is desirable that the coils be tough and resist wear by abrasion.

Each coil is arranged in its respective tread so that one of the "flat" or "squared" portions 26 is adjacent the tread surface and is arranged so that the outer surface of the one section 26 is exposed at the tread surface as indicated at 21 and 24.

As is well known, the treads of a tire are usually formed of solid rubber. However, in order that the relation of the coils to the treads may be more clearly illustrated, the usual cross hatching for rubber has been omitted. While the coils of the present invention are described as embedded in rubber treads, it is apparent that any rubber substitute used in the manufacture of such tires could be employed. For the purpose of clarity, the coils are shown in a more distended position than that in actual use.

It will be apparent from the above description that the present invention provides a tire casing construction which is equally effective for preventing skidding on ice and in affording the necessary traction in snow and/or slush.

While the invention has been described primarily in connection with the preferred form, it is to be understood that the inventive idea may be carried out in a number of ways. To illustrate, the number of central peripheral treads 17 is not restricted to two as more than two such treads can be present. Where more than two such treads are desired, such as three, for example, the lateral or transverse treads 19 would project from the two outer treads. This application is, therefore, not to be limited to the precise details described, but is intended to cover all variations and modifications thereof falling within the scope of the appended claims.

I claim:

1. In a pneumatic tire casing, the combination with a snow tread comprising a continuous peripheral tread element and a plurality of tread elements projecting laterally from said peripheral tread element, of a continuous annular wire coil embedded in said peripheral tread element, and other coils of wire embedded in said lateral tread elements.

2. In a pneumatic tire casing, the combination with a snow tread comprising a continuous peripheral tread element and a plurality of tread elements projecting laterally from said peripheral tread element, of a continuous annular wire coil embedded in said peripheral tread element, and other coils of wire embedded in said lateral tread elements, each of said lateral coils having an end thereof connected to said peripheral coil.

3. In a pneumatic tire casing, the combination with a snow tread comprising a continuous peripheral tread element and a plurality of tread elements projecting laterally from said peripheral tread element, of a continuous annular wire coil embedded in said peripheral tread element, other coils of wire embedded in said lateral tread elements, and means for anchoring at least one end of each of said lateral coils.

4. In a pneumatic tire casing, the combination with a snow tread comprising a continuous peripheral tread element and a plurality of tread elements projecting laterally from said peripheral tread element, of a continuous annular wire coil embedded in said peripheral tread element, other coils of wire embedded in said lateral tread elements, means for anchoring one end of each lateral coil to said peripheral coil, and means independent of said first anchoring means for anchoring the other end of each lateral coil.

5. In a pneumatic tire casing, the combination with a snow tread comprising a continuous peripheral tread element and a plurality of tread elements projecting laterally from said peripheral tread element, of a continuous annular wire coil embedded in said peripheral tread element, other coils of wire embedded in said lateral tread elements, means for separately anchoring one end of each lateral coil to said peripheral coil, an annular member spaced laterally from said peripheral tread element and embedded in said casing, and means for connecting the other end of each lateral coil to said annular member.

6. In a pneumatic tire casing, the combination with a snow tread comprising a continuous peripheral tread element and a plurality of tread elements projecting laterally from said peripheral tread element, of a continuous annular wire coil embedded in said peripheral tread element, other coils of wire embedded in said lateral tread elements, means for separately anchoring one end of each lateral coil to said peripheral coil, and an annular member spaced laterally from and extending substantially parallel to said peripheral tread element and embedded in said casing below said lateral tread elements, said lateral coils having the other ends thereof separately anchored to said annular member.

7. In a pneumatic tire casing, the combination with a snow tread comprising a continuous peripheral planar tread element and a plurality of tread elements projecting laterally from said peripheral tread element, of a planar continuous annular wire coil embedded in said peripheral tread element, other wire coils embedded in said lateral tread elements, means for separately anchoring one end of each lateral coil to said peripheral coil, and an annular member positioned in said casing and extending below the lateral tread elements adjacent the outer ends thereof and connected to the other ends of said lateral coils for anchoring the latter.

8. In a pneumatic tire casing, the combination with a snow tread comprising a continuous peripheral tread element, and a plurality of tread elements extending laterally from and positioned on opposite sides of said peripheral tread element, of a continuous annular wire coil embedded in said peripheral tread element, other wire coils embedded in said lateral tread elements, means for connecting the inner end of each lateral coil to said peripheral coil, a pair of annular members embedded in said casing on opposite sides of and spaced laterally from said peripheral coil, and means for connecting separately the other ends of said lateral coils to said annular members.

9. In a pneumatic tire casing, the combination with a snow tread comprising a pair of adjacently positioned central continuous peripheral treads and a plurality of treads projecting laterally from each of said peripheral treads, of a continuous annular wire coil embedded in each of said peripheral treads, a wire coil embedded in each of said lateral treads, means for connecting separately the inner ends of each lateral coil to the adjacent peripheral coil, and a pair of annular members embedded in said casing laterally of and spaced from said peripheral treads and on the opposite sides thereof and adjacent the other ends of said lateral coils, and means for connecting the other ends of said lateral coils to said annular members.

10. In a pneumatic tire casing, the combination with a snow tread comprising a pair of continuous peripheral central tread elements each of which is substantially planar and a plurality of treads projecting laterally from each peripheral tread element, of a continuous substantially planar coil of wire embedded in each peripheral tread element, a separate coil of wire embedded in each lateral tread, means for connecting separately one end of each lateral coil to the adjacent peripheral coil, a pair of substantially planar annular members embedded in said casing on opposite sides of said peripheral treads and adjacent the ends of the lateral treads, and means of connecting the other ends of each lateral coil separately to the adjacent annular member.

GEORGE F. OEST.

REFERENCES CITED

The following references are of record in the file of this patent:

UNITED STATES PATENTS

| Number | Name | Date |
|---|---|---|
| 1,094,827 | Wyllys | Apr. 28, 1914 |
| 1,176,165 | Rasmussen | Mar. 21, 1916 |
| 2,006,038 | Yamaki | June 25, 1935 |